United States Patent [19]
Curtis et al.

[11] Patent Number: 5,213,244
[45] Date of Patent: May 25, 1993

[54] OBLIQUE FRACTURING OF OPTICAL FIBERS BY ANGLED SCORING

[75] Inventors: Lyn Curtis, Fair Haven; Derek D. Mahoney, Tinton Falls; Virendra S. Shah, Edison; William C. Young, Middletown, all of N.J.

[73] Assignee: Bell Communications Research, Inc., Livingston, N.J.

[21] Appl. No.: 844,952

[22] Filed: Feb. 28, 1992

Related U.S. Application Data

[63] Continuation of Ser. No. 640,134, Jan. 3, 1991, abandoned.

[51] Int. Cl.⁵ .............................................. C03B 37/16
[52] U.S. Cl. .......................................... 225/2; 225/96.5
[58] Field of Search ................... 225/2, 96, 96.5, 101, 225/103, 104, 105

[56] References Cited

U.S. PATENT DOCUMENTS

| | | | |
|---|---|---|---|
| 4,027,814 | 6/1977 | Gloge et al. | 225/104 |
| 4,203,539 | 5/1980 | Miller | 225/2 |
| 4,322,025 | 3/1982 | Johnson | 225/96.5 |
| 4,445,632 | 5/1984 | Margolin et al. | 225/2 |
| 4,611,735 | 9/1986 | Soster et al. | 225/96.5 |
| 4,627,561 | 12/1986 | Balyashy et al. | 225/96 |
| 4,662,710 | 5/1987 | ten Berge | 225/96.5 X |
| 4,688,707 | 8/1987 | Szostak et al. | 225/2 |

*Primary Examiner*—Eugenia Jones
*Attorney, Agent, or Firm*—Leonard Charles Suchyta; Lionel N. White

[57] ABSTRACT

A smooth, oblique-angled endface fracture of an optical fiber 39 useful in low reflectance, low insertion loss mechanical splices is achieved by creating tensile stress in the fiber and scoring the fiber at an angle to its longitudinal axis. Tension may be applied by bending the fiber with a flexible platen 16 to which it is affixed, and the scoring may be accomplished by scribing the fiber surface with a sharp point or impressing a notch into the fiber with a blade 28.

13 Claims, 1 Drawing Sheet

OBLIQUE FRACTURING OF OPTICAL FIBERS BY ANGLED SCORING

RELATED APPLICATION

This application is a continuation of application Ser. No. 07/640,134, filed 3 Jan. 1991, now abandoned.

BACKGROUND OF THE INVENTION

The present invention relates to the preparation of optical fibers to be joined in end-to-end, butt-coupled splices or used in other mechanical connections. In particular, the invention provides a method and apparatus for quickly and effectively obtaining oblique angle endface fractures of optical fibers. Such endfaces are desirable for the assembly of low reflection, low insertion loss mechanical splices and connections, and the use of a fracturing method to form them avoids the tedious practice of shaping the fiber ends by means of grinding and polishing, a practice which unfortunately has additional undesirable effects upon the fiber.

The efficiency of optical fiber splices relies in great measure upon the proper preparation of the fiber ends prior to the joining of the fibers. Fusion coupling and physical contact between butt-coupled fibers have been moderately successful means for acquiring effective light transmission between fibers. These practices usually require highly precise, perpendicular endfaces, however, and much effort is expended in polishing severed fiber ends to tolerances of less than one degree from perpendicularity. An improvement in the preparation process was realized in the perpendicular fracturing of the fiber as described by Gloge et al. in U.S. Pat. No. 4,027,814. Utilizing the natural tendency of fibers to fracture in a perpendicular plane, Gloge et al. developed their method of controlling bending stress to ensure that such a fractured endface was devoid of light-scattering sites.

A number of studies, for example, Young et al., "Optimization of Return Loss and Insertion Loss Performance of Single-Mode Fiber Mechanical Splices", IWCS Conference, Reno, Nev. (1988), have indicated that improved return loss can be obtained in mechanical optical fiber splices through the use of fiber endfaces that deviate from the perpendicular by an angle in the range of about nine degrees. To implement this improvement the common practice of grinding and polishing the fiber endface was employed in forming the desired oblique angle. It was observed, however, that the polishing process causes a compaction of fiber material in the vicinity of the endface with a resulting localized variation in refractive index that introduces reflective sites adversely affecting splice return loss.

We have now discovered a method of obliquely fracturing optical fibers in order to take advantage of the desirable effect of the resulting fiber endfaces on mechanical splice return loss while enjoying the additional physical and economical benefits of a fracturing process.

SUMMARY OF THE INVENTION

The present invention relies upon our discovery that although a brittle rod material such as a glass optical fiber has the tendency under tensile stress to fracture along the plane of least resistance, namely perpendicular to the fiber axis, this tendency can be sufficiently compensated by a angled score at the fiber surface to result in an oblique fracture endface that is in the angular range most useful in high return loss, butt-coupled mechanical fiber joints.

Utilizing the procedure described by Gloge et al., noted above, to control the rate of fracture and obtain a smooth fiber endface, one embodiment of the present method comprises bending the fiber, along with an elongate, flexible backing platen to which it is firmly clamped, sufficiently to create a distributed tensile stress in the fiber and scoring the fiber surface at an angle of about 15 degrees from perpendicular to the fiber axis to initiate a fracture at the score. The noted tendency for the stress to be relieved most efficiently along the perpendicular plane apparently is countered by the angle of the score with the result that the fracture takes place along an intermediate plane that runs, on average, at about nine degrees from perpendicular to the fiber axis. In experimental tests fibers with endface fracture angles ranging from about 6 to 12 degrees exhibited return losses greater than 70 dB, as compared with perpendicularly endfaced fibers.

A rugged device suitable for use in the field to reliably obtain optimally angled oblique endface fibers has been constructed. In a preferred embodiment, the device includes means for guiding the orientation of a fiber on the platen surface at the desired angle to a scoring blade. Manual actuation of the device moves a pair of clamping faces into position to hold the fiber against the platen. Further movement then bends the platen and fiber about a fulcrum, thereby creating tensile stress in the fiber, and depresses the scoring blade into the fiber surface at the pre-oriented angle to cause the fracture. The plunging action of the scoring blade in this embodiment is particularly useful in penetrating the protective coating normally enveloping the commercial fiber and thus eliminates the need to strip the coating in order to obtain a proper fracture. Multiple fibers may also be obliquely fractured, with consistent results, in a single operation.

Variations in the embodiment of the device may provide guide means, such as a slotted or tubular member, for orienting the fiber either along the longitudinal axis of the platen or at the desired angle to the axis. Where both directions of orientation are provided, a scoring blade set perpendicular to the platen axis can serve to obtain either oblique endfaces for high return loss butt splices or perpendicular endfaces for fusion or other style splices. Another variation may fix the fiber orientation along the platen axis and provide means for selecting between scoring blade orientations that are perpendicular to or at the prescribed angle to the platen axis, thereby likewise providing for perpendicular as well as oblique endfaces.

In circumstances where the stripping of fiber coating is not a hindrance, the plunging blade may readily be replaced with a scribing point arranged for transverse movement across the platen and the bared surface of a clamped fiber. As with the blade embodiment, the fiber may be oriented along or at an angle to the platen axis to obtain perpendicular or oblique endfaces. In an additional embodiment variant, the tensile stress may be created by the direct application of longitudinal tension to the fiber and the angled scoring may be effected by blade or scoring tool set at the prescribed angle to the fiber axis.

THE DRAWING

The present invention will be described with reference to the accompanying drawing of which:

DESCRIPTION OF THE INVENTION

Figure 1:
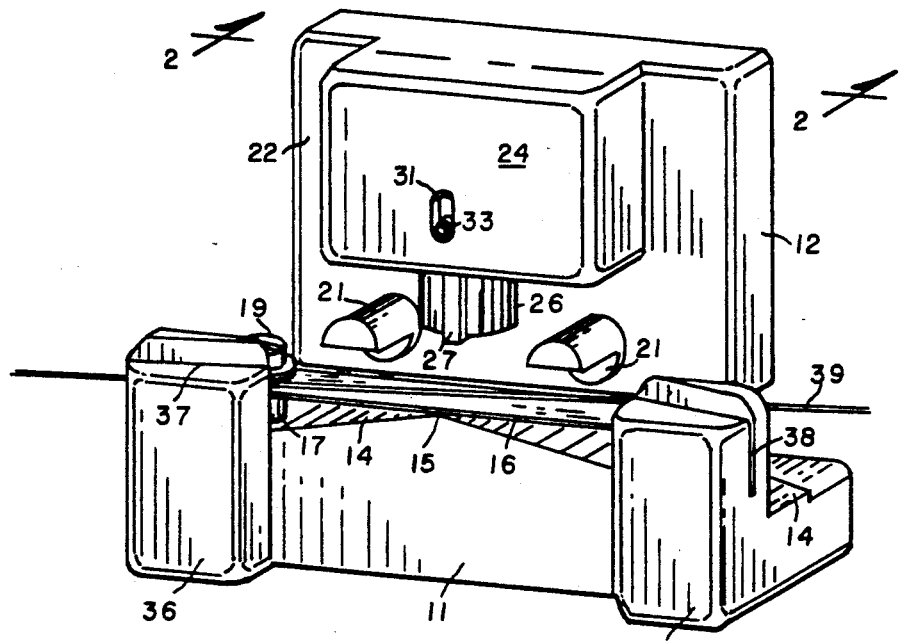
FIG. 1 is an oblique view of a device embodying the invention.

In FIG. 1 of the drawing there is depicted an embodiment of the present invention in a device that is useful in obtaining clean oblique endfaces of commercial optical fibers under field conditions. As shown, the device comprises a base member 11 and a head member 12 which is mounted on posts 13, more readily seen in FIG. 2, for reciprocal vertical movement. Compression springs, not shown, located at the upper ends of the bores in which posts 13 are received urge head 12 away from base 11, but allow head 12 to be moved toward base 11 upon the application of force to the upper surface of head 12.

A portion of the upper surface of base 11 is in the form of a pair of ramps 14 which meet in a centrally-located apex to define a lateral fulcrum 15. An elongate resilient platen 16 of spring steel, or the like, is supported at its lateral axis on fulcrum 15. Studs 17 adjustably fixed in base 11, as by screw threads, are located in ramps 14 and receive the slotted ends of platen 16, thereby maintaining the lateral axis of platen 16 in position on fulcrum 15. Collars 18 on studs 17 bear upon the surface of platen 16 to ensure firm contact of platen 16 with fulcrum 15. Slots 19 in the upper ends of studs 17 serve a dual function of providing means for adjusting studs 17 with the aid of a screwdriver, or similar tool, and of providing fiber-orienting means, as will be described later in greater detail.

A pair of studs 21 are journaled for rotation in a vertical face 22 of head 12 adjacent the ramped surface 14 and fulcrum 15 of base 11. Studs 21 are respectively located on opposite sides of fulcrum 15 and extend outwardly from face 22 to overhang surface 14. A portion of the extending ends of studs 21 have been removed to form planar contact surfaces 23 which may optionally be faced with resilient material to ensure full contact with a positioned fiber during operation of the device.

Figure 2:
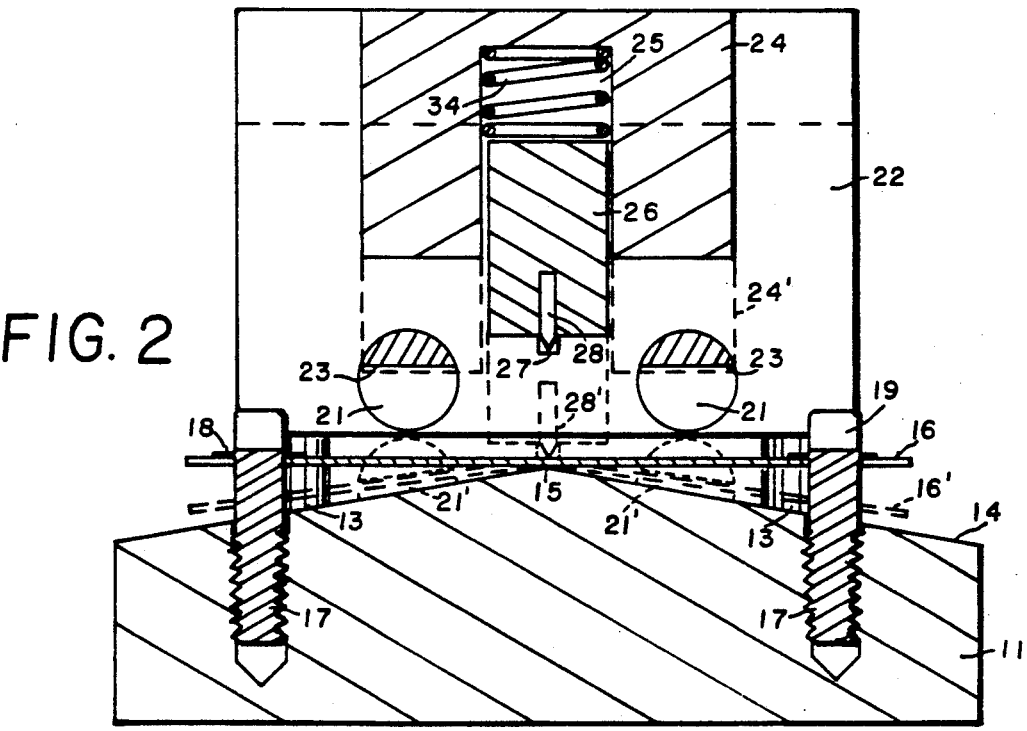
FIG. 2 is a front elevation view of the device of FIG. 1 taken in partial section along 2—2.

A portion 24 of head 12 extends outwardly from face 22 to overhang studs 21 and base surface 14. A vertical bore 25 in the lower face of head portion 24 is centered above fulcrum 15 of base 11. A piston element 26 situated in bore 25 is free to reciprocate vertically, but is restrained from rotary movement by protruding key elements 27 which engage vertical slots, not shown, in the wall of bore 25. Fixed within the lower end of piston 26 is blade 28 at least the protruding, sharpened lower edge of which comprises a material, such as diamond or metal alloy, which is considerably harder than glass. Piston 26 is normally rotationally oriented by keys 27 within bore 25, as depicted in FIG. 2, such that the sharpened edge of blade 28 is coplanar with fulcrum 15; however, in a variant embodiment mentioned above, the rotation restraining function of keys 27 may be provided by detent means, thereby allowing piston 26 to be selectably rotated to either of the predetermined orientations which aligns the edge of blade 28 with fulcrum 15 or at a prescribed angle thereto.

In order to protect the finely sharpened edge of blade 28 from damage by contact with platen 16, the lower ends of keys 27 extend slightly more beyond the end surface of piston 26 than does blade 28, thus providing a stand-off of about 100 micrometers which will not otherwise interfere with contact between blade 28 and even a stripped fiber of typical 125 micrometer diameter positioned upon platen 16. The lower reach of the reciprocal movement of piston 26 is determined by the positioning of slot 31 in head portion 24 and retaining pin 33 affixed in piston 26. Such positioning is in turn determined by the lower reciprocal reach of head 12 with respect to fulcrum 15 and will at least allow contact of keys 27 with platen 16. The downward movement of head 12 will proceed beyond such minimal contact, however, to allow the contact faces 23 of studs 21 to move past the plane of fulcrum 15. In order to account for such additional movement of head 12, piston 26 is enabled by the length of slot 31 to move upward in bore 25. Such upward movement is absorbed by compression spring 34 at the upper end of bore 25 which serves the additional purpose of ensuring that at least a minimum penetrating force of about 300 grams is applied by blade 28, even in the event that the device is employed in an inverted position.

Base 11 further comprises a pair of upstanding pedestals 36 situated adjacent the respective ends of ramp surfaces 14. The upper ends of pedestals 36 extend above fulcrum 15 and a platen 16 supported by the fulcrum. Vertical slots 37, 38 in the upper ends of pedestals 36 are disposed at about plus and minus 75 degrees, respectively, to the line of fulcrum 15 and thus provide means for orienting a fiber 39 inserted in one such slot, e.g. 37, at about 15 degrees to the longitudinal axis of platen 16. The presence of two such positioning slots allows an operator to use the preferred right or left hand to grasp the fiber. As earlier noted, each of platen-retaining posts 17 is slotted at 19 in its upper end. Slots 19 will normally be aligned with the longitudinal axis of platen 16 and will thus provide a means for orienting along that axis a fiber inserted into both such slots.

Prior to the beginning of the operation of the device, base 11 normally rests upon a supporting table, bench, or the like, or the device may be held in the operator's hand, substantially in the attitude shown in FIG. 1. Head 12 is supported at its uppermost position, as depicted by solid lines in FIG. 2, by the springs at the tops of posts 13 so that contact faces 23 of studs 21 are situated above the surface of platen 16 as it is supported by fulcrum 15 between retaining studs 17. Piston 26 with the edge of its blade 28 paralleling fulcrum 15, in this embodiment, rests above platen 16 at its lowest reach as determined by retaining pin 33 at the bottom of guide slot 31.

The operator then begins the fiber fracturing process by laying fiber 39 across platen 16 and positioning the running portion of the fiber in slot 37 of pedestal 36, presumably with the left hand. The natural stiffness of the fiber causes its relatively short extension 39 beyond slot 37 to follow the direction of that slot at an angle of about 15 degrees from the longitudinal axis of platen 16, or 75 degrees from the line of fulcrum 15 and the edge of blade 28. With the fiber thus oriented on platen 16 at the right intersection of the planes of the platen axis and the blade edge, the operator presses down on head 12 to cause it to move toward base 11 and bring faces 23 of studs 21 into contact with fiber 39, clamping the fiber firmly to the surface of platen 16 in its 15 degree orientation.

Continued downward force upon head 12 is transmitted by studs 21 to fiber 39 and platen 16, causing them to bend together over fulcrum 15 and thereby create a tensile stress in the length of fiber between stud faces 23. Further depression of head 12 increases the degree of bending and fiber tension and brings the edge of blade 28 into contact with the fiber, which for the sake of drawing clarity has been omitted from FIG. 2. With still further downward movement of head 12, the force of spring 34 maintains scoring pressure of blade 28 upon the fiber while the additional platen bending increases the fiber stress.

At a point where head portion 24 has moved to a position 24', the studs, now at 21', have caused the platen to bend to 16' where the combination of tensile stress in the fiber and the angled penetration of blade 38 into the surface of the fiber result in the fracture of the fiber at the desired angle of about 6 to 12 degrees, intermediate the orientation angle of the fiber and the fiber perpendicular. Upon fiber fracture, spring 34 continues to force blade 28 toward platen 16; however, key ends 27 contact the platen and arrest the blade at a position 28', short of the platen surface. The subsequent removal of downward force on head 12 allows the head to be restored to its original position by action of the internal springs on posts 13, thereby releasing the clamping action of stud faces 23 upon platen 16 and permitting the resilient return of the platen to its position 16 against collars 18 and the removal of the prepared fiber from the device.

The foregoing procedure with a fiber orientation of 15 degrees was carried out on a prototype device as shown in FIG. 1 to obtain a series of ten oblique endfaces. As measured with a microscope and precision azimuth table, as well as by a transmitted light beam displacement method, the endfaces averaged 7.4 degrees. The return loss of light transmitted to these fiber endfaces in a 1300 nanometer optical time domain reflectometer (OTDR) test instrument averaged greater than 70 dB. Similar processing in a second prototype device of like configuration provided a series of 15 fibers whose endface angles averaged 9.6 degrees and return loss exceeded the 70 dB limit of the OTDR instrument.

A variant embodiment of the invention was carried out by applying direct longitudinal tension to a fiber in contact with an inflexible backing platen and pressing into the fiber a blade oriented at an angle of 75 degrees from the the fiber axis, i.e. 15 degrees from the transverse perpendicular. In separate tests under a tension of 100 grams, a commercial coated fiber fractured with endfaces averaging 9.6 and 11.2 degrees, respectively, which under OTDR test showed maximum return loss. In the variant device, a stripped fiber produced a series of endfaces that measured an average of 8.2 degrees and exhibited maximum return loss.

As is evident from the results of the above tests, a given scoring angle in the depicted device embodiment and variants thereof will provide consistent fiber fractures yielding endfaces within the range of oblique angles that have been shown to be useful in low insertion loss, high return loss butt-coupled, index-matched mechanical optical fiber splices. It is anticipated, however, that minor adjustments in the degree of the prescribed scoring angle may prove advantageous in accounting for the varying physical properties to be found among optical fibers from different manufacturers. For such purpose it would, of course, be advisable for the blade angle of a device to be infinitely variable within the general range described above. Other embodiments of the present invention will also undoubtedly become apparent to the skilled artisan in the light of the foregoing description, and such embodiments are likewise intended to be encompassed within the scope of the invention as recited in the following claims.

What is claimed is:

1. A method of fracturing a length of optical fiber to obtain a plane endface which comprises creating sufficient tensile stress in said fiber length to cause said fiber to fracture at a score in the surface of said fiber length and scoring said fiber length surface
   characterized in that said fiber length is oriented substantially horizontally and an upper portion only of said fiber length surface is scored in a vertical plane that is oblique to the longitudinal axis of said fiber length, whereby said fiber endface plane is oblique to said fiber length axis.

2. A method according to claim 1
   characterized in that said stress is created by applying longitudinal tension to said fiber length.

3. A method according to claim 1
   characterized in that said stress is created by
   a) orienting said fiber length on the upper surface of a substantially horizontal elongate flexible planar platen having a longitudinal axis and in a direction generally longitudinal of said platen axis;
   b) clamping said fiber length to said platen upper surface at a pair of spaced locations situated along said platen axis; and
   c) bending said platen about an axis lying perpendicular to said platen longitudinal axis and disposed under said platen intermediate said spaced locations to thereby form a convexity in the upper platen surface to which said fiber length is clamped.

4. A method according to claim 3
   characterized in that
   a) said fiber length is oriented on said platen surface in the direction parallel to said platen axis; and
   b) said fiber length upper surface portion is scored by pressing thereinto a tool with a sharpened leading edge oriented at an angle of about 15 degrees from said platen axis.

5. A method according to claim 3
   characterized in that
   a) said fiber length is oriented on said platen surface at an angle of about 15 degrees from said platen axis; and
   b) said fiber length upper surface portion is scored by pressing thereinto a tool with a sharpened leading edge oriented perpendicular to said platen axis.

6. A method according to claim 1
   characterized in that said fiber length upper surface portion is scored by pressing thereinto a tool with a sharpened leading edge oriented at an angle of about 15 degrees from said fiber length axis.

7. A device for fracturing an optical fiber to obtain an endface plane oblique to the axis of said fiber comprising an elongate substantially horizontal flexible planar platen having a longitudinal axis, means for clamping a length of said fiber to the upper surface of said platen at a pair of spaced locations situated along said platen axis, and means for bending said platen about a fulcrum disposed under the lower surface of said platen intermediate said spaced locations and perpendicular to said platen axis, thereby creating sufficient tensile stress in said fiber to cause said fiber to fracture at a score in the surface thereof characterized in that said device comprises means for scoring an upper portion only of said fiber length surface intermediate said spaced locations in a vertical plane that is oblique to the longitudinal axis of said fiber length.

8. A device according to claim 7
characterized in that said scoring means comprises:
a) means for orienting said fiber length on said platen upper surface in a predetermined direction with respect to said platen axis prior to the clamping of said fiber length to said platen upper surface;
b) a scoring tool comprising a sharpened leading edge situated above said platen upper surface and in said vertical plane; and
c) means for moving said leading edge down said vertical plane into the upper surface of said fiber length subsequent to said fiber clamping.

9. A device according to claim 8
characterized in that said fiber orienting means comprises at least one guide member disposed adjacent said platen and adapted to receive and position said fiber along said platen upper surface in said predetermined direction.

10. A device according to claim 9
characterized in that said at least one guide member extends upwardly beyond the plane of said platen upper surface and presents a transverse slot sized to receive said fiber, said slot being disposed in said predetermined direction.

11. A device according to claim 8
characterized in that said predetermined direction is about 15 degrees from said platen axis and said vertical plane is oriented substantially perpendicular to said platen axis.

12. A device for fracturing a length of optical fiber to obtain a plane endface which comprises means for creating sufficient tensile stress in said fiber length to cause said fracturing at a score in the surface thereof and means for scoring said fiber length surface characterized in that said device further comprises means for orienting said fiber length substantially horizontally and said scoring means is arranged for scoring an upper portion only of said fiber length surface in a vertical plane that is oblique to the longitudinal axis of said fiber length, whereby said fiber endface fracture plane is oblique to said fiber length axis.

13. A device according to claim 12
characterized in that
a) said fiber orienting means comprises:
   1) a substantially horizontal elongate flexible planar platen having a longitudinal axis; and
   2) means for positioning said fiber length along the upper surface of said platen in a predetermined direction with respect to said platen axis;
b) said means for creating stress in said fiber length comprises:
   1) means for clamping said fiber length to said platen upper surface at a pair of spaced locations situated along said platen axis;
   2) a fulcrum disposed under said platen intermediate said spaced locations and perpendicular to said platen axis; and
   3) means for bending said platen about said fulcrum; and
c) said means for oblique scoring of said fiber length comprises:
   1) a scoring tool comprising a sharpened leading edge situated above said platen upper surface; and
   2) means for moving said leading edge down said vertical plane into the upper surface portion of said clamped fiber length intermediate said spaced locations.

* * * * *